United States Patent [19]

Kiyohara

[11] 3,728,952
[45] Apr. 24, 1973

[54] DEVICE FOR CONTROLLING SHUTTER RELEASE OPERATION IN PHOTOGRAPHIC CAMERAS

[75] Inventor: Takehiko Kiyohara, Kaza-gun, Zama-machi, Japan

[73] Assignee: Canon Kabushiki Kaisha, Tokyo, Japan

[22] Filed: Dec. 23, 1971

[21] Appl. No.: 211,346

[30] Foreign Application Priority Data

Dec. 28, 1970 Japan..............................45/128421

[52] U.S. Cl. ...............................................95/53 EB
[51] Int. Cl. ..............................................G03b 9/58
[58] Field of Search ................95/10 C, 10 CT, 53 R, 95/53 E, 53 EB

[56] References Cited

UNITED STATES PATENTS 3,561,342  2/1971  Starp...................................95/53 EB
3,548,732  12/1970  Rentschler..........................95/53 EB
3,187,653  6/1965  Rentschler..........................95/53 EB

FOREIGN PATENTS OR APPLICATIONS 1,269,885  6/1968  Germany............................95/53 EB Primary Examiner—Joseph F. Peters, Jr.
Attorney—William R. Woodward

[57] ABSTRACT

A device for controlling shutter release operation in photographic cameras comprises a connecting member connected to a camera's shutter release member to effect shutter release operation. The connecting member and an operable starting member are connected together by an intermediate connecting member capable of releasably establishing a mechanical connection by means of an electromagnetic member. The intermediate connecting member is engaged and disengaged under control of time limit means adapted to carry out a predetermined time limit action.

5 Claims, 3 Drawing Figures

INVENTOR:
TAKEHIKO KIYOHARA

INVENTOR:
TAKEHIKO KIYOHARA

DEVICE FOR CONTROLLING SHUTTER RELEASE OPERATION IN PHOTOGRAPHIC CAMERAS

BACKGROUND OF THE INVENTION

1. Field of the Invention

This invention relates to a device for controlling shutter release operation in photographic cameras, and more particularly to such a device which is provided with time limit means for increasing the shutter speed range of a camera with which the device is used.

2. Description Of The Prior Art

In the commonly used photographic cameras, the shutter speed thereof has a very much limited range such as 1/1000 to 1 sec. and only such time range is usable. In taking a picture of an object having a variable brightness, however, the camera's $f$-value and shutter speed must be varied in accordance with the variable brightness of the object and this has often led to an unsuccessful result that an exposure value corresponding to the brightness of the object cannot be obtained even by using the minimum or maximum relative aperture of the aperture device and limiting the shutter speed to a level within its variable range.

Especially for an object of low brightness, where a proper exposure could not be achieved even by using the maximum relative aperture of the aperture device and the lowest available shutter speed, it has been practised to adjust the shutter speed control dial to its position B (bulb) and manually open the shutter and close it after a predetermined time.

In such cases, however, the manual opening and closing of the shutter and the possible inaccuracy of the time limit action is likely to cause a failure in providing a proper long-time exposure. A solution to such a problem has heretofore been proposed as by U.S. Pat. No. 3,548,732, which discloses a camera adapter of the attachment type which may be mounted on the release button of a camera body to actuate the release button and which incorporates a time limit means for holding the release button actuated for a predetermined accurate time limit action thereof.

When such a conventional adapter is used and mounted on a camera body to effect a long-time exposure, an adapter starting button is depressed to actuate the camera's release button to thereby release the camera's shutter, whereby time limit means contained in the adapter is actuated to return the camera's release button to its initial position after a predetermined time and close the shutter. However, if the operator of the camera depresses the starting button and maintains it in its depressed position without immediately releasing his finger from the button, then the release button would not return to its initial position even after the time limit means has completed its action and the camera's release rod has returned to its initial position, thus resulting in a shutter exposure time extended beyond a time limit determined by the time limit means.

Especially where the brightness of the object is low, the operator often tends to keep the starting button depressed for a longer time than necessary from his over-consciousness of the necessity for a long-time exposure to be effected, and thus, even after the time limit action of the time limit means has been completed, the starting button is continuedly depressed to prevent the shutter from shifting to its closing action, with a result of over-exposure.

Further, in the release device of the conventional adapter type, the starting button is held by an electromagnetic member and the holding current is cut off after a predetermined time to release the starting button from its held position, whereupon the camera's release button associated with the starting button is actuated. Therefore, the starting button needs to be depressed by a force necessary to actuate the camera's release button and, accordingly, the holding current in the electromagnetic member for holding the starting button is increased to a level higher than a predetermined value, which means that a considerably heavy current must be supplied to the electromagnetic member. This has immediately led to the necessity of using a power source such as battery of high capacity and great volume for the conventional release device, whereas a release device of the adapter type usable with photographic cameras, especially of the compact portable type, must satisfy such requirements as sufficient compactness for portability and durable reliability in operation.

SUMMARY OF THE INVENTION

It is an object of the present invention to eliminate all the foregoing disadvantages existing in the release device of the prior art and provide a device for controlling shutter release operation in which a connecting member connected to a camera's shutter release member to effect shutter release operation and an operable starting member are connected together by an intermediate connecting member capable of releasably establishing a mechanical connection by means of an electromagnetic member, said intermediate connecting member being engaged and disengaged under control of time limit means adapted to carry out a predetermined time limit action.

It is another object of the present invention to provide a device of the type described just above in which the connecting member comprises deceleration means whose mechanical connection can be established and released by the operation of the electromagnetic member using an operating current of small magnitude.

BRIEF DESCRIPTION OF THE DRAWINGS

These and other objects of the present invention will become fully apparent from the following detailed description of some embodiments thereof taken in conjunction with the accompanying drawings, in which.

DESCRIPTION OF THE PREFERRED EMBODIMENTS

Figure 1:
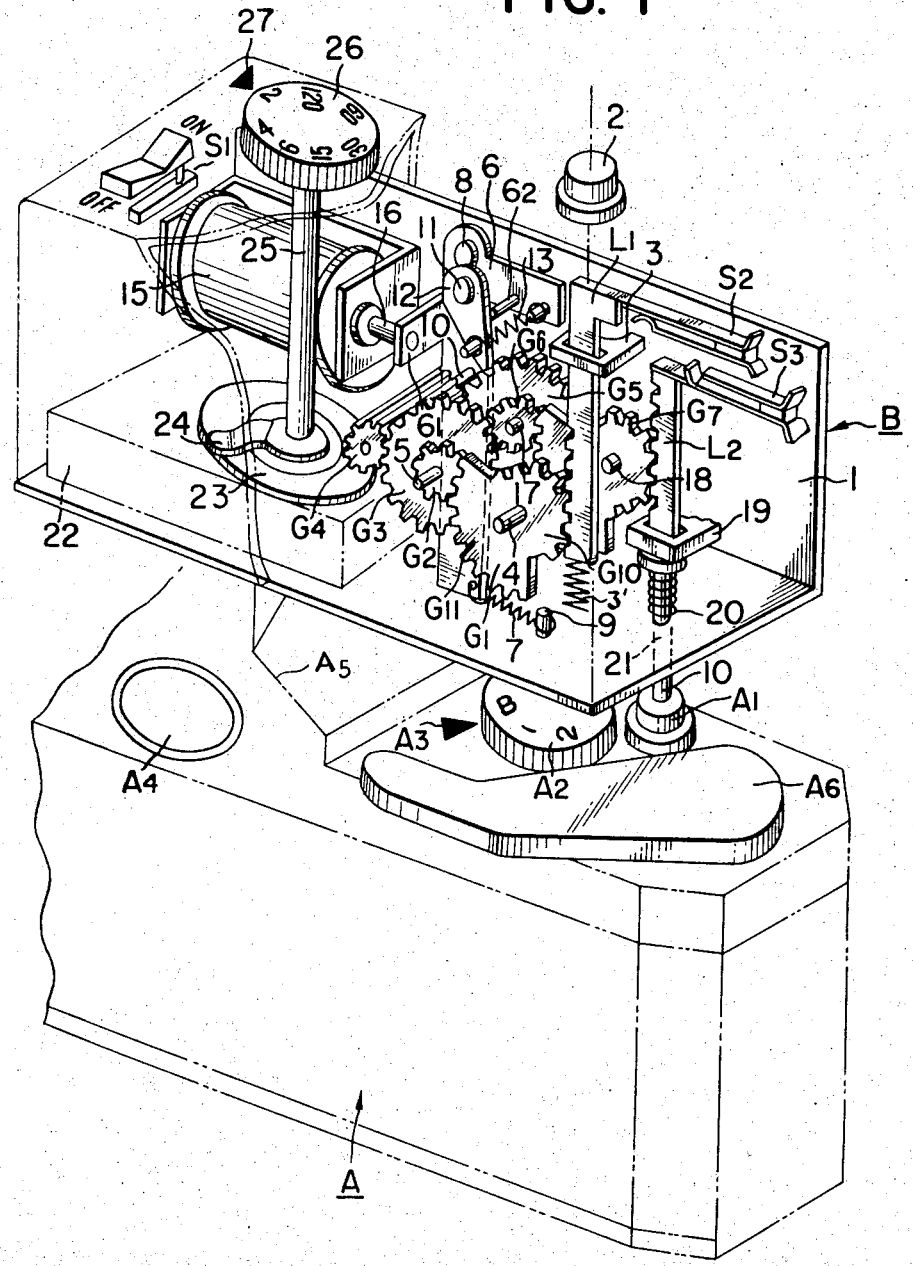
FIG. 1 is a perspective view of a camera body having attached thereto the device for controlling shutter release operation according to an embodiment of the present invention.

Referring to FIG. 1, a single-lens reflex camera body A to which the device of the present invention is attached is shown in a perspective view as seen from the back side thereof. The camera body A includes a shutter release button A1, a shutter speed control dial A2, a reference index A3 for the shutter dial, a viewfinder A4, a penta-dach prism portion A5 and a film advance lever A6. A release action control adapter according to the present invention generally designated by letter B, is mounted on top of the camera body A by means of a shoe coupling (not shown) provided on the penta-dach prism portion A5 below an accessory shoe (not shown). The adapter B includes a housing 1, through the top wall of which is formed a hole (not shown) for passing therethrough a release starting button 2. A guide member 3 is secured to a side wall of the housing 1, and a rack L1 extends through the guide member 3 and has an L-shaped head portion biased into resilient contact with the bottom end face of the starting button 2 by a return spring 3' provided below the guide member. A gear G1 is rotatably mounted on a fixed shaft 4 studded on a side wall of the housing 1, and has a toothed portion G10 in meshing engagement with the rack L1. Coaxial gears G2 and G3 formed integrally with each other are loosely mounted for rotation on a fixed shaft 5 studded on a side wall of the housing 1, the gear G2 being in meshing engagement with the toothed portion G11 of the gear G1. An L-shaped lever 6 has its angular portion pivotally supported by a pin 8 studded on a side wall of the housing 1, the lower end of the lever 6 being normally biased counter-clockwise by a spring 7 extending to studded pins 9 on the bottom wall of the housing 1. A shaft 10 is fixed to the lever 6 and rotatably carries thereon an elongated gear G4, which is brought into meshing engagement with gear G3 by the force of the spring 7.

A pin 11 is studded on the lever 6 and a pawl 12 is pivotally mounted on the pin 11. The tip end of the pawl 12 is urged into contact with gear G5 by the force of a spring 13 extended between fixed pins studded on the lever 6. A stop member $6_2$ is also studded on the lever 6. The lever 6 has a projection $6_1$ connected to the movable member 16 of a solenoid 15. Gears G5 and G6, formed integrally with each other, are rotatably mounted on a fixed shaft 17 studded on a side wall of the housing, and gear G7 is loosely mounted on a fixed shaft 18 studded on a side wall of the housing and has a pinion-like portion engaged with the toothed portion of a rack L2. The rack L2 is slidably extended through a slot formed in a guide member 19 fixed to the housing 1 and is normally biased upwardly at the lower portion thereof by a return spring 20 interposed between a flange portion integral with the rack L2 and the bottom wall of the housing 1.

The lower portion of the rack L2 is formed integrally with a connecting rod 21 so that the release member A1 on the camera body and the connecting rod 21 are brought into abutment with each other when the adapter B is mounted on the camera body A. A normally open switch S2 and a normally closed switch S3 are provided on the head portions of the racks L1 and L2, respectively. These switches S2 and S3 are closed and opened upon downward movement of the racks L1 and L2, respectively. Time limit means 22 contains therein a timer circuit as later described and shown in FIG. 3. A stationary resistor 23 constituting a variable resistor is fixedly mounted on the time limit means. A movable member 24 is slidable on the stationary resistor 23 and connected through a connecting rod 25 to a shutter speed control knob 26. A reference index 27 is formed on the upper surface of the housing 1 so as to cooperate with the knob 26.

Figure 3:
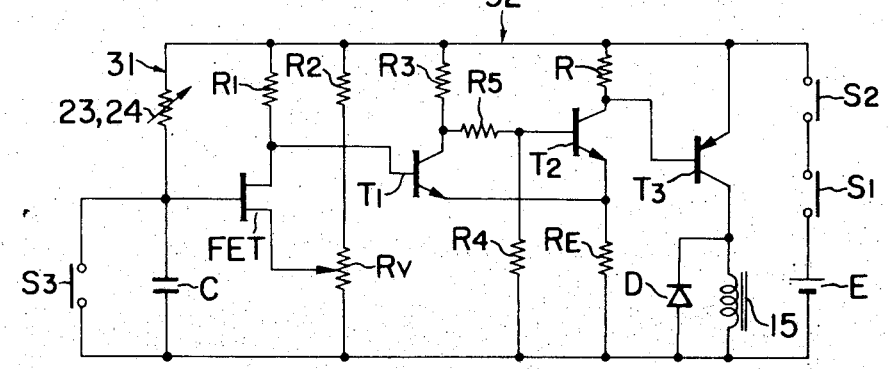
FIG. 3 diagrammatically shows the electric circuit of the time limit means used with the device shown in FIG. 1 or 2.

The timer circuit contained within the time limit means 22 is diagrammatically shown in FIG. 3. In this figure, a capacitor C and a short-circuiting switch S3 are parallel-connected with each other and adjustable resistors 23–24 constituting variable resistors are connected in series with the capacitor C, thus forming a time constant circuit. It is connected with a power source E through a power switch S1 and a switch S2. The circuit of FIG. 3 further includes a field effect type transistor FET, bias resistors R1 and R2, a bias setting variable resistor Rv, and NPN type transistors T1 and T2. Transistors T1 and T2, together with bias resistors R3, R4, R5 and a common emitter resistor RE, constitute a Schmitt circuit. An NPN type transistor T3 has its collector connected with plunger 15 and with diode D for the racks.

In operation, the adapter B is first mounted on the camera body A and then the mark B (bulb) on the shutter dial A2 is registered with the reference index A3 to thereby bring the camera's shutter into position B (bulb). A desired shutter speed indicated on the timer setting dial 26 of the present device is suitably selected to register with the reference index 27, whereupon the movable member 24 is rotated to a position corresponding to the selected shutter speed to thereby determine the resistance value of the variable resistors 23, 24. The shutter starting button 2 is depressed, whereby the rack L1 is lowered to close the switch S2 and rotate the gear G1 in clockwise direction.

The rotation of gear G1 is accelerated and transmitted by gears G2 and G3 to gear G4, which in turn transmits counterclockwise rotation to gear G5. However, the pawl 12 engaged with the gear G5 acts to prevent clockwise rotation thereof and accordingly, upward movement of the rack L2 is prevented. The rotation of the gear G5 is decelerated and transmitted by gears G6 and G7 to lower the rack L2, whereupon switch S3 is opened. With the lowering of the rack L2, the rod 10 is lowered to actuate the shutter release member A1 associated therewith, whereby the camera's shutter is opened. In the electric circuit formed in the time limit means as shown in FIG. 3, the main switch S1 is closed. Subsequently, switch S2 is closed upon lowering of the rack L1, thereby applying a voltage to the circuit. With the lowering of the rack L2, switch S3 is then opened to open the short-circuit across the capacitor C, which is thus charged through the variable resistors 23, 24 whose resistance values are then at a level set in accordance with the selected shutter speed. After the lapse of a time corresponding to the set shutter speed, the transistor FET conducts at a predetermined voltage and its signal is amplified by Schmitt circuit 32 to thereby render the transistor T3 conductive to pass a current to the electromagnet or plunger 15. The electromagnet 15 thus energized attracts the movable member 16 to rotate the L-shaped lever 6 clockwise about the shaft 8 against the force of the spring 7, so that the engagement between gear G4 and gears G3, G5 is released and subsequently the stop pin $6_2$ strikes the pawl 12 to pivot the latter clockwise, whereby the gear G5 is freed from the pawl 12 for rotation in clockwise direction. As the result, the gears G6 and G7 are also free to rotate so that the rack L2 is raised by the force of the spring 9 to thereby return the release member A1 to its initial position. In consequence, the release member A1 now starts its action to close the camera's shutter, which is thus closed.

Upon return of the rack L2 to its uppermost position, switch S3 is closed to discharge the capacitor C (FIG. 3), whose terminal voltage is thus decreased to cut off the current to the plunger or electromagnet 15 so that the L-shaped lever 6 (FIG. 1) is returned to its initial position.

Figure 2:
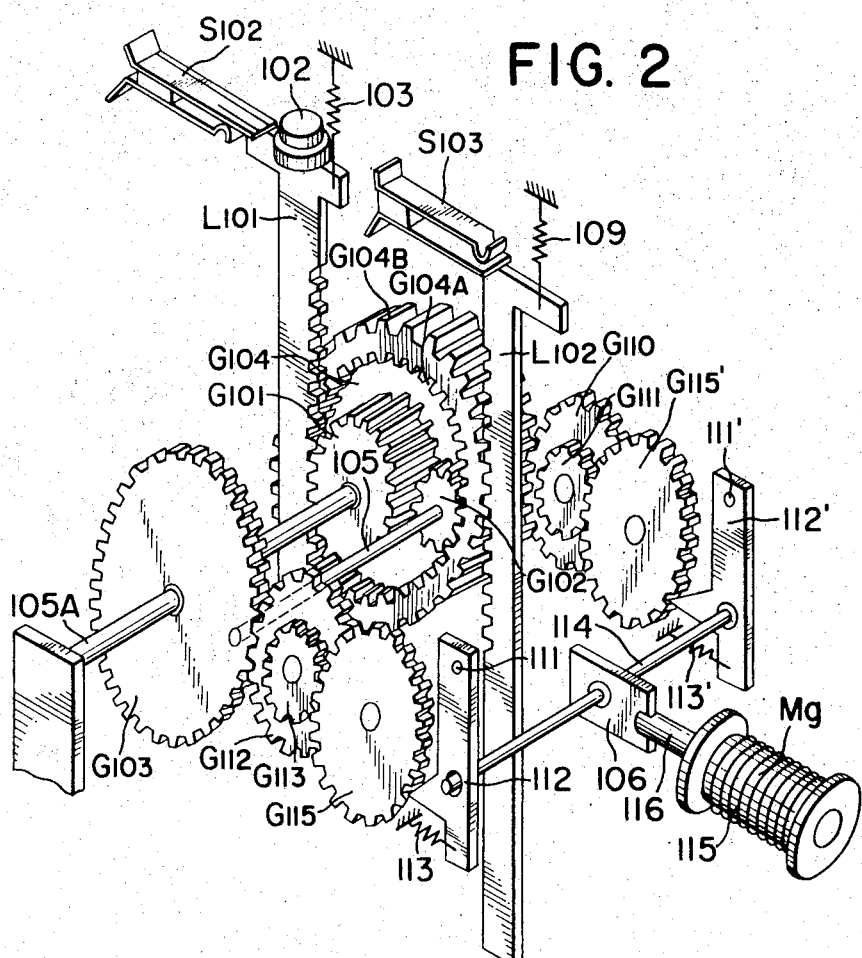
FIG. 2 is a perspective view of the device for controlling shutter release operation according to another embodiment of the present invention.

FIG. 2 shows a modification of the mechanism contained in the housing 1 of the adapter B shown in FIG. 1. To clarify the correspondence with the device of FIG. 1, similar parts are designated by numerals with a prefix number 100, such as 102 for the starting button shown by 2 in FIG. 1. The starting button 102 is similar to that designated by 2. Rack L101 is biased upwardly by return spring 103, and switch S102 is a normally open switch in contact with the head portion of rack L101 and adapted to be closed upon lowering of this rack. Gear G101 is loosely mounted on a fixed shaft 105A studded on the housing. A satellite gear 102 is floatable between and engageable with the gear G101 and the internal toothed portion G104A of large gear G104 rotatably mounted coaxially with gear G101. The satellite gear G102 is rotatably mounted on a shaft 105 extending from gear G102. The external toothed portion G104B of the gear G104 is in engagement with the toothed portion of rack L102 integrally holding a connecting member for connecting the rack to the camera's release member A1. The gear G104 has its external toothed portion G104B operatively connected to gear G115' via gears G110 and G111 rotatably mounted on a fixed shaft studded on the housing. On the other hand, gear G103 is operatively connected to a gear G115 via gears G112 and G113 rotatably mounted on a fixed shaft studded on the housing. Pawls 112 and 112' are pivotally mounted on fixed pins studded on the housing, and biased clockwise by springs 113 and 113', respectively. The tip ends of the respective pawls 112 and 112' are engaged with the toothed portions of gears G115 and 115', respectively. A driving pin 114 at its opposite ends passes through holes formed in the pawls 112 and 112' and is connected via connecting member 106 to the movable member 116 of solenoid 115.

In operation, the shutter starting button 102 is depressed to lower the rack L101, thus closing the switch S102 while causing counter-clockwise rotation of the gear G101. The rotation of this gear G101 is transmitted to the gear G102, which in turn rotates the gear G104 due to its engagement with the internal toothed portion G104A of the gear G104. Because of the engagement between the external toothed portion G104B of the gear G104 and the rack L102, this rack is lowered to actuate the camera's shutter release member (not shown) so as to open the camera's shutter.

The rotation of the gear G104 is accelerated and transmitted through the gear train G104–G110–G111 to the last gear G115', which is prevented from counter-clockwise rotation by a slight force imparted thereto by the pawl 112', so that the gear G104 is allowed to rotate clockwise only, thereby limiting the upward movement of the rack L102. The counter-clockwise rotation of the gear G101 causes a component of counter-clockwise rotational force to be produced about the shaft 105 of the gear G102, and the rotational force of the gear G103 subjected to such component of rotational force is accelerated and transmitted through the gear train G112–G113–G115 so as to appear as a slight counter-clockwise rotational force in the last gear G115. However, such counter-clockwise rotation of the gear G115 is prevented by the pawl 112, with a result that any counter-clockwise rotation of the gear G103 is blocked to prevent the shaft 105 from rotating counter-clockwise about the shaft 105A. With the lowering of the rack L101, switch 102 is closed to apply a voltage to the timer circuit. With further lowering of the rack L102, switch S103 is opened so that the short-circuit across the capacitor C (FIG. 3) is opened to charge the capacitor until it reaches a predetermined voltage after a preset time, whereupon transistor T3 is rendered conductive through the other transistors to pass a current to the electromagnet or plunger 115. The electromagnet 115 thus energized attracts the movable member 116 to thereby move the drive member 114 loosely connected to the connecting member 106, so that the pawls 112 and 112' loosely connected to the drive member 114 are rotated counter-clockwise against the forces of the springs 113 and 113' respectively, thereby releasing the gears 115 and 115' to allow these gears to freely rotate in counter-clockwise direction. As a result, the rack L102 is raised by the return force of the spring 109. The upward movement of the rack L102 causes the shutter release member to close the camera's shutter. It should be noted that when the rack L101 is restrained by finger pressure on the button 102 from upward movement during the counter-clockwise rotation of the gear G115, the gear G101 does not rotate and therefore the gear G102 must revolve about the gear G101 to allow the gear G104 to rotate counter-clockwise. Consequently, the counter-clockwise rotation about the shafts 105 and 105A is allowed as long as the engagement is released between the pawl 112 and the gear G115. When the rack L102 returns to its uppermost position, switch S3 is opened to discharge the capacitor C (FIG. 3), whose terminal voltage is thus reduced to cut off the current to the electromagnet or plunger 115, whereby engagement is resumed between the gear G115' and the pawl 112' and between the gear G115 and the pawl 112.

It will thus be appreciated that according to the present invention, the starting button and the connecting member for actuating the camera's shutter release button are operatively connected together to transmit the depressing force of the starting button to the release button at the time of releasing to thereby actuate the release button, whereafter the connecting member is driven under control of the time limit means independently of the starting button and returned to its initial position by the time limit means independently of the operation of the starting button. Accordingly, whether or not the starting button, once depressed, remains in its depressed position, the camera's release member is returned to its initial position after the time limit means has completed its time limit action, so as to close the shutter after a predetermined time, whereby exposure is achieved in the camera exactly at a preset shutter speed.

Furthermore, the starting button and the connecting member for actuating the camera's release member are designed so that they are accelerated so as to be disengaged from each other by an electromagnetic member, whereafter they are decelerated to actuate the connecting member. Therefore, the engagement caused to take place between the accelerating mechanism and the decelerating mechanism by the electromagnetic member can be accomplished with a very low actuating force. Thus, the electromagnetic member used with the present invention is capable of accomplishing the engagement by a relatively weak current and this leads to a small capacity and compactness of the electromagnetic member and its power source, which in turn is very useful to make the adapter compact and longer in service life.

I claim:

1. A device for controlling shutter release operation operatively connected to a shutter release member of a photographic camera, comprising:
   a starting member operable and movable for shutter release;
   a connecting member operatively connected to said shutter release member of the camera;
   a resilient member secured to said connecting member to impart thereto a resilient pressure in its return direction;
   drive transmission means including connecting means for operatively connecting said starting member and said connecting member, said connecting means comprising switching means for interrupting the operative connection between said starting member and said connecting member and further comprising a group of acceleration gears and a group of deceleration gears, said group of acceleration gears being operatively connected to said starting member and said group of deceleration gears being connected to said connecting member for said shutter release member; and
   time limit means adapted to start its time limit action upon actuation of said starting member so as to effect the time limit action for a predetermined time, said time limit means being connected to said switching means to release the operative connection of said connecting means through said switching means upon completion of the time limit action of said time limit means, thereby returning said connecting member for the release member to its initial position.

2. A device according to claim 1 wherein said connecting means further comprises at least a one-way drive transmission member engaged with at least one of said gears adapted to rotate it in one direction and to transmit only the force of said starting member in its actuating direction to said connecting member for said release member.

3. A device according to claim 1, wherein said time limit means comprises an electronic time limit circuit and an electromagnetic member connected with the output of said circuit, and said switching means comprises a connecting gear for operatively connecting said group acceleration gears and said group of deceleration gears, and a member for carrying said connecting gear, said carrying member being connected to said electromagnetic member to establish and release engagement of said connecting gear upon energization and deenergization of said electromagnetic member.

4. A device according to claim 2, wherein said time limit means comprises an electronic time limit circuit and an electromagnetic member connected with the output of said circuit, and said one-way drive transmission member is connected to the actuator of said electromagnetic member so as to be deactivated by said electromagnetic member after a limited time means, thereby allowing said connecting member for the release member to be returned to its initial position by the force of said resilient member.

5. A device according to claim 4, wherein said connecting means comprises a group of acceleration gears and a group of deceleration gears, said group of acceleration gears being operatively connected to said starting member said group of deceleration gears being operatively connected to said connecting member for the shutter release member, said two groups of gears being provided with one-way transmission members respectively.

* * * * *